United States Patent [19]

Singelyn et al.

[11] Patent Number: 5,219,674
[45] Date of Patent: Jun. 15, 1993

[54] SEALANT FOR POROUS FUEL CELL COMPONENT FRAMES USING POLYMERIZATION OF MONOMERS

[75] Inventors: James D. Singelyn, Newington; Dan E. Elmore, South Windsor, both of Conn.

[73] Assignee: International Fuel Cells Corporation, South Windsor, Conn.

[21] Appl. No.: 813,465

[22] Filed: Dec. 26, 1991

[51] Int. Cl.$^5$ .............................................. H01M 8/02
[52] U.S. Cl. .................................... 429/36; 29/623.2; 427/115
[58] Field of Search .................. 429/35, 36; 29/623.2, 29/623.5; 427/115

[56] References Cited

U.S. PATENT DOCUMENTS

| | | | |
|---|---|---|---|
| 4,450,212 | 5/1984 | Feigenbaum et al. | 429/35 |
| 4,728,701 | 3/1988 | Jarvis et al. | 526/65 |
| 4,781,727 | 11/1988 | Mitsudo et al. | 29/623.2 |

*Primary Examiner*—Anthony Skapars
*Attorney, Agent, or Firm*—Pamela J. Curbelo

[57] ABSTRACT

A porous plate used in a fuel cell is sealed with an essentially 100% active material and catalyst mixture. The mixture is absorbed into and fills essentially the entire void volume provided by the pores. The mixture is then thermally shocked to partially cure the mixture thereby preventing wicking. The partially cured mixture is then post cured by elevating the temperature such that the catalyst initiates free radical polymerization. Since the sealant is essentially 100% active, there are no escape paths formed during the curing process, and the final seal is essentially 100% leak proof.

12 Claims, No Drawings

SEALANT FOR POROUS FUEL CELL COMPONENT FRAMES USING POLYMERIZATION OF MONOMERS

DESCRIPTION

1. Technical Field

The present invention relates to an edge sealant, and especially to an edge sealant for a porous plate using polymerization of monomers.

2. Background Art

The production of electricity is often the function of various types of fuel cells arranged in fuel cell stacks. The fuel cells are comprised of components including a cathode and an anode with an electrolyte disposed therebetween, a cathode chamber and an anode chamber.

Actual electricity production is accomplished via a reaction between a fuel and an oxidant which causes free electrons to flow through an external load. Hydrogen and oxygen are introduced to the anode and cathode of a fuel cell, respectively, by separate and distinct passageways. At the anode, hydrogen is ionized to hydrogen ions and free electrons. The free electrons pass through an external load to the cathode, thereby producing electricity, while the hydrogen ions migrate through an electrolyte to the cathode. At the cathode, the hydrogen ions and free electrons react with oxygen to form water.

The water produced at the cathode can be removed from the cathode with porous plates which serve a dual function in the fuel cell. These porous plates act as cathode chambers by directing the oxidant to the cathode, and also act as a water removal system by removing water from the cathode (disclosed in U.S. Pat. No. 4,769,297 and U.S. Pat. No. 5,064,732). Essentially, a pressure differential is maintained across the porous plate, thereby causing the water produced at the cathode to pass through the porous plate. The pore size in the porous plate works in combination with the pressure differential such that when water builds up at the cathode, the pressure differential across the porous plate goes to zero and the water is discharged through the porous plate. The pressure differential is known as the bubble pressure and is generally between about 1 and about 5 pounds per square inch (psi). The area through which the water passes is known as the active area of the porous plate.

Since mixing of the fuel and oxidant can cause direct combustion or an explosion, it is necessary to prevent the leakage of fuel and oxidant through the porous plate. Oxidant flow through the porous plate is prevented by the water which occupies the pores in the active area. However, there is a leakage problem experienced on the edge of the porous plate. The edge of the porous plate corresponds to that area from the outer parameter to the active area of the porous plate. The edge includes the area surrounding the passageways and is generally between about 0.5 and about 1.0 inch wide, and the length and width of the porous plate.

The edge of the porous plate can be under as much as about 100 psi, which is well above the bubble pressure of water. Therefore, since the pressure is so great and is greater than the bubble pressure, the water cannot prevent leakage at the edge of the porous plate. It would be blown through the pores of the porous plate at such pressures. The edge seal, therefore, must be able to prevent gas flow from the edge of the porous plate overboard to the atmosphere.

It is additionally important to maintain a seal around the edge of the porous plate because, lack of a seal around the edges prevents the maintenance of a pressure differential across the porous plate. Without a pressure differential, water does not pass through the pores based upon bubble pressure and may build up and interfere with the reaction at the cathode, and oxidant is allowed to escape. As a result, it is important to seal the edges of the porous plates to allow the maintenance of the bubble pressure and to prevent leakage of the oxidant.

What is needed in the art is a simple process for sealing the edge of porous plates.

DISCLOSURE OF THE INVENTION

The present invention relates to a method for sealing porous plates in fuel cells. This method consists of combining an essentially 100% active 20 sealant with a catalyst to form a mixture. At least one edge of a porous plate is then impregnated with the mixture such that the mixture essentially fills the void volume formed by the pores at the edge of the porous plate. The mixture is then polymerized via thermal shock to a partially cured state and post cured.

The foregoing and other features and advantages will become more apparent from the following description.

BEST MODE FOR CARRYING OUT THE INVENTION

The present invention is particularly useful in sealing the edges of porous fuel cell component plates to prevent leakage of liquids and gases. The advantage of the present invention is that the porous plate void volume is filled with a sealant comprised of essentially 100% active material. As a result, there are essentially no volatiles released during curing which can form escape paths and therefore possible leakage paths for the oxidant.

The sealant can be any conventional active material having the following characteristics: surface tension to wet the substrate, low viscosity to penetrate and fill the pores, essentially no volatiles (about 100% reactive), latently catalyzed, "in situ" polymerized, compatible with the fuel cell environment, and stable. It is preferred that this sealant be latent catalyzed, heat activated and have a stability for greater than about 10 years.

Since the environment of each fuel cell varies radically from that of another fuel cell, no one generic type of sealant can be used in all fuel cells. For example, for the polymeric electrolyte membrane (PEM) fuel cell, the sealant can be selected from monomers, prepolymers, or oligomers which can be cured via free radical polymerization. Such sealants include acrylates, pyrrolidones, styrenes, vinyl esters, epoxies, polyethylene imides, mixtures thereof, and others. The preferred sealant for use with a PEM fuel cell is methacrylate terminated long chain diol, known as Sartomer ® 2100, having a molecular weight of 300 and a viscosity of 20 centipoise (cps). However, in other fuel cells such as acidic and base fuel cells, sealants such as Bismaleimide ® and Epon ® are useful.

The variance in the fuel cell environments can often be extreme. This variance can range from the phosphoric acid fuel cell which is acidic and operates at about 450° F. (232° C.) to the PEM fuel cell which is essentially neutral and operates at about 180° F. (82° C.)

to the base fuel cell which is caustic and operates at about 220° F. (105° C.). As a result, as is stated above, the sealant which is useful with each fuel cell also varies. A few examples of sealants for various fuel cells are listed below.

| FUEL CELL TYPE | ENVIRONMENT | SEALANT (ST) ST: CHEMICAL CLASS | ST: SPECIFIC EXAMPLE |
| --- | --- | --- | --- |
| Acid | 450° F. acidic | polyethyleneimide | Bismaleimide ® (at 350° F.) |
| PEM | 180° F. neutral | acrylates | Sartomer ® 2100 |
| Base | 220° F. caustic | epoxy | Epon ® |

Prior to being introduced to the porous plate, the sealant is typically mixed with a catalyst which initiates free radical polymerization, maintains the viscosity of the mixture, and does not poison the fuel cell. Conventional catalysts capable of initiating free radical polymerization at elevated temperatures, which do not release volatile gases during polymerization, and which are preferably inert at room temperature (approximately 77° F. (25° C.)) can be employed. Peroxides, peroxyketals, and other catalysts from the peroxide family have proven particularly useful in this functiion.

In the PEM fuel cell, benzoyl is the preferred catalyst because of its compatibility with this fuel cell. Additionally, it is latent at room temperature, its volume remains essentially constant during cure, and it does not form escape paths. On the other hand, if Bismaleimide ® is used in an acid cell, no catalyst is necessary. Bismaleimide ® is a two component monomer system which is heated to about 350° F. (177° C.) and applied to the porous plate during its initial cure cycle. Polymerization is then completed by merely maintaining the temperature of the Bismaleimide ® at about 400° F. (205° C.) for approximately 6 hours.

The amount of the catalyst to be mixed with the sealant can readily be determined by one skilled in the art by following the stoichiometry of the polymerization reaction. A sufficient amount of catalyst to polymerize the sealant should be utilized. The preferred amount of the catalyst, however, is greater than the stoichiometric amount in order to ensure 100% conversion of the sealant. For example, for the PEM fuel cell with Sartomer ® 2100 sealant and benzoyl peroxide catalyst, about 100 parts per hundred (pph) sealant to 1.5 pph catalyst is preferred.

Once the catalyst and sealant have been combined to form a homogeneous mixture, the mixture is applied to the porous plate in the desired area, typically the edge, by any conventional method. Typical methods include painting, printing, padding, dipping, or spraying the mixture into the selected area to be sealed.

The preferred consistency of the mixture is determined by the pore size of the plate. A fine pore size of less than about 1 micron, such as the graphite fine pore of the PEM fuel cell, requires a viscosity of approximately 10 to about 25 cps, which is only slightly higher than the viscosity of water. If the viscosity is lower than about 10 cps, the mixture would run out of the pore rather than fill it while a viscosity higher than about 25 cps would not penetrate the pore. An artisan can readily determine the proper viscosity for the given pore size. If, however, a sealant having the desired viscosity for the given pore size is not available, a vacuum can be utilized to pull the sealant into the plate. The use of a vacuum, however, is not preferred. Since a vacuum requires additional equipment, it complicates the sealing process. Additionally, the vacuum will often pull sealant into undesired areas, such as the active area which the water passes through, thereby decreasing the efficiency of the porous plate and the fuel cell.

If the mixture possesses the proper viscosity, it is absorbed into the pores of the plate as it is applied. A sufficient amount of mixture should be absorbed into the porous plate to substantially fill the void volume formed by the pores. The preferred amount of mixture can readily be determined by an artisan by calculating the amount of void volume knowing the porosity of the plate. With the void volume known, a full void volume can be determined by the weight pickup of the plate.

After the void volume of the pores in the area to be sealed is filled, it is necessary to halt further migration of the mixture. Migration of the mixture through the plate is halted by thermal shock. Thermal shock partially cures the mixture to a gel state, thereby setting it in place. If the mixture is not set, the sealant can continue to migrate through the plate. As a result, when the sealant is subsequently cured, it can seal or partially block areas where the flow of water is desired, and can thereby reduce the effectiveness of the porous plate for removing water. In turn, the efficiency of the active area of the cathode is reduced due to water accumulation at the cathode preventing oxidant from reaching all of the reaction cites at the cathode.

Generally, the mixture is thermally shocked at approximately the operating temperature of the fuel cell until it is partially cured. Thermal shock temperatures range from about 180° F. (82° C.) to about 500° F. (260° C.) for up to about 3 hours.

The amount of partial curing preferred is at least about one half life of the sealant. At this stage of cure, the sealant is essentially in a gel form which is not viscous and which therefore does not migrate through the porous plate. For example, if an acrylate terminated diol, such as Sartomer ® 2100, is utilized as the sealant and benzoyl peroxide is used as the catalyst, the mixture is preferably thermally shocked anaerobically at approximately 250° F. (121° C.) for about 30 minutes.

After the mixture has been thermally shocked, it is then post cured to assure essentially complete polymerization of the sealant. Generally, essentially complete polymerization is attained at eight half lives of the sealant.

Since the thermal coefficient of expansion and contraction of the sealant varies considerably with temperature, the cured sealant expands and contracts with temperature. However, the pores of the plate, relative to the sealant, expand and contract only to a very minor degree and therefore remain essentially unchanged with temperature variation. As a result, in order for the sealant to fill the void volume under operating conditions, it must be cured essentially under those conditions. Such curing enables the cured sealant to have an expansion and contraction memory, thereby allowing the most stable operation of the fuel cell. If the temperature of the sealed area is lowered appreciably, leaks will result when the sealant pulls away and shrinks in the pore. If the temperature of the sealed area is increased too high, the expanding sealant could cause cracks in the porous plate.

Even though curing temperatures and time periods vary depending upon the specific type fuel cell, the curing temperatures typically range from about 180° F. (82° C.) to about 500° F. (260° C.) for a time period between about 1 hour to about 10 hours. If the plate is to be used in a PEM fuel cell, the cure temperature of a mixture of Sartomer ® 2100 and benzoyl peroxide typically ranges from about 220° F. (105° C.) to about 250° F. (121° C.) for about 4 hours to about 9 hours, with 225° F. for about 6 hours to about 8 hours preferred.

On the other hand, if the plate is impregnated with Bismaleimide ® and is to be utilized in an acid cell, the cure temperature is typically between about 350° F. (177° C.) and about 450° F. (232° C.) for a period between about 6 hours and about 10 hours, with about 400° F. (205° C.) for about 7 to about 8 hours preferred. Once cured, the sealant provides a total, essentially 100%, solid barrier, impermeable to gases and liquids. Leak paths are eliminated.

EXAMPLE

The following procedure has been used to produce an essentially 100% leak-proof PEM fuel cell plate. The sea a mixture of Sartomer ® 2100 and benzoyl peroxide.

1. Sartomer ® 2100, 100 grams, and benzoyl peroxide, 1.5 grams, were placed in a bottle whose size was essentially commensurate with the volume of the Sartomer and benzoyl peroxide mixture.

2. The bottle was rolled on a mill to form a homogenous mixture of the Sartomer and benzoyl peroxide. The use of the bottle prevents air from being trapped in the mixture. Air can react with the benzoyl peroxide and reduce, its catalytic efficiency.

3. The edge, a 0.5 inch parameter around a 6.0 inch by 10.0 inch by 0.08 inch graphite fine pore fuel cell plate, was then painted with 5 grams of the mixture which was allowed to migrate into the pores.

4. Excess mixture was wiped from the plate and the mixture within the pores was thermally shocked at 250° F. (121° C.) for 30 minutes to cause partial curing to about one half life.

5. The temperature of the partially cured mixture was then decreased to 225 F (107° C.) and maintained overnight, about 8 hours, to fully cure the partially cured mixture to about eight half lives.

The resulting sealed plate was then tested for leakage which was less than 0.05 cc/min.

Advantages of the present invention ranges from simplicity to effectiveness. The present invention forms leak-proof plates out of the edges of the component plates of a fuel cell. The sealant is applied to the area of the porous plate to be sealed, it is then thermally shocked and cured. This process does not require successive impregnations of the sealant to asymptotically attain a leak-proof seal. Also, this sealant maintains an expansion and contraction memory thereby allowing optimum operation in the desired temperature range. With the sealant of the present invention, there are essentially no volatiles and therefore escape paths are eliminated and an expansion-contraction memory is maintained, and therefore, an approximately 100% leak-proof seal is obtained.

Although this invention has been shown and described with respect to detailed embodiments thereof, it will be understood by those skilled in the art that various changes in form and detail thereof may be made without departing from the spirit and scope of the claimed invention.

We claim:

1. A method for sealing a porous plate in a fuel cell, said porous plate having at least one edge, which comprises the steps of:
   a. combining volatile free sealant with a catalyst to form a mixture;
   b. impregnating at least one edge of the porous plate with said mixture, wherein said mixture essentially fills the porous void volume of said edge of said porous plate;
   c. thermally shocking said mixture to a partially cured state; and
   d. post curing said partially cured mixture.

2. A method for sealing a porous plate as in claim 1 wherein said mixture is partially cured at essentially the operating temperature of the fuel cell.

3. A method for sealing a porous plate as in claim 1 wherein said partially cured mixture is post cured at essentially the operating temperature of the fuel cell.

4. A method for sealing a porous plate as in claim 1, wherein the catalyst is benzoyl peroxide.

5. A sealed porous plate for use in a fuel cell, said porous plate having at least one edge, wherein said sealed porous plate is formed using the steps of:
   a. combining a volatile free sealant with a catalyst to form a mixture;
   b. impregnating at least one edge of the porous plate with said mixture, wherein said mixture essentially fills the porous void volume of said edge of said porous plate;
   c. thermally shocking said mixture to a partially cured state; and
   d. post curing said partially cured mixture; whereby said seal is essentially 100% leak-proof.

6. A sealed porous plate as in claim 5 wherein said mixture is partially cured at essentially the operating temperature of the fuel cell.

7. A sealed a porous plate as in claim 5 wherein said partially cured mixture is post cured at essentially the operating temperature of the fuel cell.

8. A sealed a porous plate as in claim 5, wherein the catalyst is benzoyl peroxide.

9. A method for sealing a porour plate as in claim 1 wherein said sealant is selected from the group consisting of monomers, prepolymers, or an oligomer which can be cured via free radical polymerization.

10. A method for sealing a porour plate as in claim 1 wherein said sealant is selected from the group consisting of acrylate, pyrrolidone, styrene, vinyl ester, epoxy polyethylene imine, or a mixture thereof.

11. A sealed porous plate as in claim 5 wherien said sealant is selected from the group consisting of monomers, prepolymers, or an oligomer which can be cured via free radical polymerization.

12. A sealed porous plate as in claim 5 wherien said sealant is selected from the group consisting of acrylate, pyrrolidone, styrene, vinyl ester, epoxy polyethylene imine, or a mixture thereof.

* * * * *

UNITED STATES PATENT AND TRADEMARK OFFICE
CERTIFICATE OF CORRECTION

PATENT NO. : 5,219,674

DATED : June 15, 1993

INVENTOR(S) : James D. Singelyn et al

It is certified that error appears in the above-identified patent and that said Letters Patent is hereby corrected as shown below:

TITLE PAGE:
[57] ABSTRACT

Line 3, "material" should be --sealant--.

Column 2, line 20, delete "20".

Signed and Sealed this

Eleventh Day of January, 1994

Attest:

BRUCE LEHMAN

*Attesting Officer*         *Commissioner of Patents and Trademarks*